(12) United States Patent
Rosseel

(10) Patent No.: US 6,283,147 B1
(45) Date of Patent: Sep. 4, 2001

(54) NON-RETURN VALVE FOR A FUEL TANK

(75) Inventor: Alexis Rosseel, Compiegne (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/362,019

(22) Filed: Jul. 27, 1999

(30) Foreign Application Priority Data

Jul. 28, 1998 (FR) .................................................. 98 09616

(51) Int. Cl.$^7$ .................................................. F16K 15/14
(52) U.S. Cl. .................... 137/512.15; 137/854; 137/592; 251/75
(58) Field of Search ............................. 137/512.15, 854, 137/592; 251/75

(56) References Cited

U.S. PATENT DOCUMENTS

| 2,225,395 | * | 12/1940 | Young | 37/512.15 |
| 3,036,592 | * | 5/1962 | Lips | 251/75 X |
| 3,069,125 | * | 12/1962 | Hewitt, Jr. | 251/75 |
| 3,112,768 | * | 12/1963 | Thompson | 251/75 |
| 3,417,768 | * | 12/1968 | Wasson | 251/75 |
| 3,519,012 | * | 7/1970 | Patten | 137/512.15 |
| 3,911,949 | * | 10/1975 | Hilden et al. | 137/592 X |
| 3,949,433 | * | 4/1976 | Liou | 251/75 |
| 4,188,676 | * | 2/1980 | Tolnai et al. | 251/75 |
| 4,501,374 | * | 2/1985 | Robertson | 220/86.2 |
| 4,579,141 | * | 4/1986 | Arff | 251/75 X |
| 4,974,645 | * | 12/1990 | Johnson | 141/59 |
| 5,327,871 | * | 7/1994 | Gryc | 123/510 |
| 5,464,350 | | 11/1995 | Bierbaum . | |
| 5,518,026 | * | 5/1996 | Benjey | 137/512.15 |
| 5,660,206 | * | 8/1997 | Neal et al. | 137/592 |

FOREIGN PATENT DOCUMENTS

| 3738089 | 5/1989 | (DE) . |
| 0796602 | 9/1997 | (EP) . |

\* cited by examiner

*Primary Examiner*—John Rivell
(74) *Attorney, Agent, or Firm*—Schweitzer Cornman Gross & Bondell LLP

(57) ABSTRACT

A non-return valve for a fuel tank, the valve including a bistable closure member. The closure member is made of an elastomeric plastics material and in the closed position it has an umbrella-configuration, and in the open position it has an inverted umbrella-configuration.

5 Claims, 1 Drawing Sheet

NON-RETURN VALVE FOR A FUEL TANK

The present invention relates to a non-return valve for a fuel tank.

BACKGROUND OF THE INVENTION

Such a valve is mounted at the end of the tube which is used for filling the tank, firstly to prevent the fuel that is present in the tank from being expelled in the event of pressure in the tank rising excessively, and secondly to reduce any risk of leakage in the event of an accident that has led to the tube being broken.

OBJECT AND SUMMARY OF THE INVENTION

The object of the present invention is to provide a novel non-return valve which is reliable and relatively low cost in structure.

The non-return valve of the invention includes a bistable closure member.

In other words, the closure member has a stable closed position and it can be moved into a likewise stable open position under the effect of the pressure of fuel in the filler tube.

Preferably, the closure member has an umbrella-configuration in the closed position and it passes to an inverted umbrella-configuration in the open position.

Return of the closure member into the closed position can take place, for example, under the effect of a wave of fuel in the tank.

By means of the invention, the tank can be filled at a relatively high rate, because while the fuel is passing through the valve it does not need to overcome a resilient return force tending to return the closure member into its closed position.

BRIEF DESCRIPTION OF THE DRAWING

The invention will be better understood on reading the following detailed description of a non-limiting embodiment, and on examining the accompanying drawing, in which.

MORE DETAILED DESCRIPTION

Figure 1:
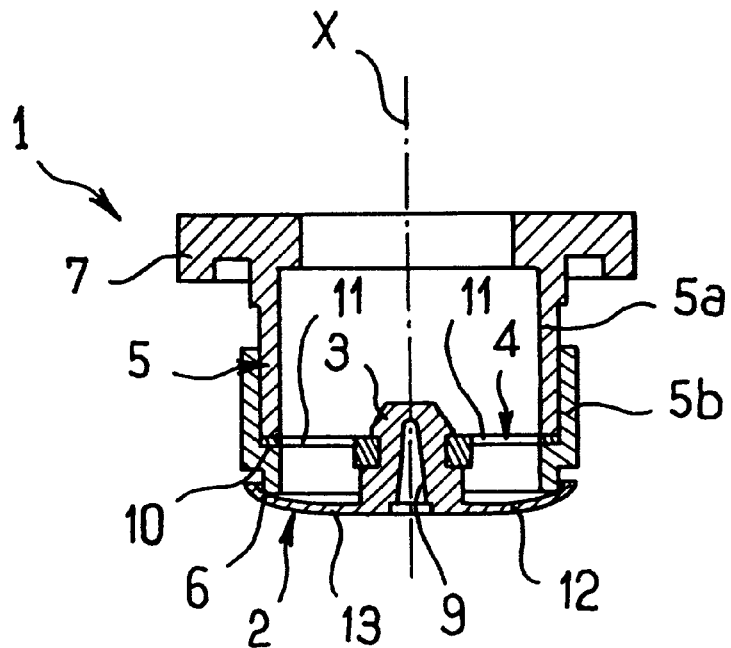
FIG. 1 is a diagrammatic axial section view of a valve of the invention.
Figure 2:
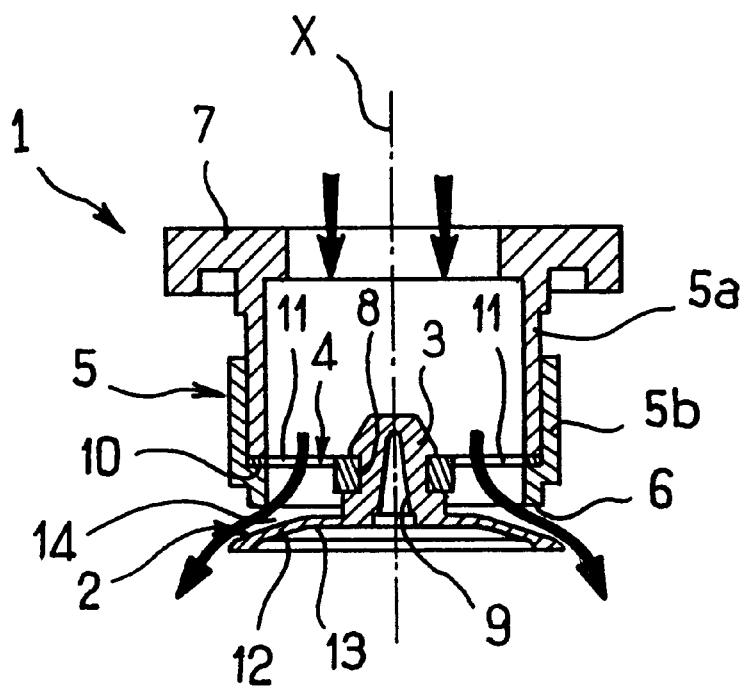
FIG. 2 is a view analogous to FIG. 1 showing the closure member in its open position.

The valve 1 shown in FIGS. 1 and 2 comprises a deformable closure member 2 having a central stud 3 for fastening to a support disk 4, which disk is secured at its periphery to a body 5 that is generally circularly cylindrical in shape about an axis of symmetry X.

One axial end 6 of the body 5 serves as a seat for the closure member 2 when it is in its closed position, and the other axial end 7 of the body is provided with a flange enabling it to be fixed to the tank.

The stud 3 includes an annular groove 8 which snap-fastens in a bore formed through the center of the disk 4.

In order to facilitate radial deformation of the stud 3 during snap-fastening, a blind hole is provided inside the stud and opening out away from the disk 4.

In the example described, the body 5 is constituted by two coaxial portions 5a and 5b that are engaged one in the other.

The radially outer portion 5b has a shoulder 10 against which the disk 4 is held by the radially inner portion 5a.

The disk 4 has openings 11 allowing fuel to pass through axially when the closure member 2 is in its open position, as shown in FIG. 2.

The closure member 2 has a membrane 12 integrally formed with the stud 3 by molding an elastomeric plastics material.

At rest, the membrane 12 is generally concave in shape towards the inside of the body 5 and its periphery rests against the end 6 of the body 5 to close the valve in sealed manner.

Under the effect of a flow of fuel entering the body 5 and coming from a filler tube, the membrane 12 can deform, providing the force exerted by the fuel is sufficient, thereby changing configuration and taking up the inverted umbrella-configuration shown in FIG. 2.

On passing from the umbrella-configuration to the inverted umbrella-configuration, the membrane 12 passes through an intermediate state in which internal stresses are at a maximum.

In the inverted umbrella-configuration, the outer face 13 of the membrane 12 is concave, thereby leaving an annular gap 14 relative to the end 6 of the body 5, through which gap the fuel can flow freely.

In accordance with the invention, the membrane 12 is relatively stable in its open position, which means that it tends to retain the inverted umbrella-configuration, even if the pressure of the fuel in the filler tube becomes practically zero.

Thus, once the closure member 2 has been opened, fuel can flow freely through the valve without it being necessary for it continuously to overcome a return force urging the closure member 2 towards its closed position.

Once filling has been completed, the membrane 12 can return to its closed configuration, as shown in FIG. 1, under the effect of a wave of fuel sloshing back towards the valve 1, for example.

Naturally, the invention is not limited to the embodiment described above.

In particular, it is possible to modify the shape of the closure member without going beyond the ambit of the invention.

What is claimed is:

1. A fuel tank comprising a non-return valve including a bistable closure member made of elastomeric plastics material, said member being arranged in a filler tube so as to take an open configuration during filling of the tank and a closed configuration under a backflow of fuel, wherein in a closed position said closure member has an umbrella configuration and in the open position an inverted umbrella configuration.

2. A fuel tank according to claim 1, wherein the closure member is fixed via a central stud to a support disk, which disk is held via its periphery to the body of the valve.

3. A fuel tank according to claim 2, wherein one of the axial ends of said body serves as a seat for the closure member in its closed position.

4. A fuel tank according to claim 3, wherein the other axial end of said body serves to mount the valve on the tank.

5. A fuel tank according to claim 3, wherein said body is constituted by an assembly of two portions engaged one in the other, the disk supporting the closure member being held against a shoulder of one of the portions by the other portion.

* * * * *

UNITED STATES PATENT AND TRADEMARK OFFICE
Certificate

Patent No. 6,283,147 B1

Patented: September 4, 2001

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Alexis Rosseel, Compiegne, France; and Patrice Baudoux, Flavy Le Martel, France.

Signed and Sealed this First Day of October 2002.

MICHAEL P. BUIZ
*Supervisory Patent Examiner*
Art Unit 3753